(12) United States Patent
Bar-Yossef et al.

(10) Patent No.: US 7,640,488 B2
(45) Date of Patent: Dec. 29, 2009

(54) SYSTEM, METHOD, AND SERVICE FOR USING A FOCUSED RANDOM WALK TO PRODUCE SAMPLES ON A TOPIC FROM A COLLECTION OF HYPER-LINKED PAGES

(75) Inventors: Ziv Bar-Yossef, Ra'annana (IL); Tapas Kanungo, San Jose, CA (US); Robert Krauthgamer, Albany, CA (US)

(73) Assignee: International Business Machines Corporation, Armonk, NY (US)

( * ) Notice: Subject to any disclaimer, the term of this patent is extended or adjusted under 35 U.S.C. 154(b) by 791 days.

(21) Appl. No.: 11/004,412

(22) Filed: Dec. 4, 2004

(65) Prior Publication Data

US 2006/0122998 A1 Jun. 8, 2006

(51) Int. Cl.
*G06F 17/00* (2006.01)
*G06F 17/20* (2006.01)
(52) U.S. Cl. .................................. 715/205; 715/208
(58) Field of Classification Search .................. 715/205
See application file for complete search history.

(56) References Cited

U.S. PATENT DOCUMENTS

| 6,418,433 B1* | 7/2002 | Chakrabarti et al. | 707/5 |
| 6,691,108 B2* | 2/2004 | Li | 707/3 |
| 7,080,073 B1* | 7/2006 | Jiang et al. | 707/7 |
| 7,328,401 B2* | 2/2008 | Obata et al. | 707/3 |
| 2003/0204502 A1* | 10/2003 | Tomlin et al. | 707/5 |
| 2006/0074905 A1* | 4/2006 | Yun et al. | 707/5 |
| 2006/0190561 A1* | 8/2006 | Conboy et al. | 709/217 |

OTHER PUBLICATIONS

Avin et al.,"Efficient and Robust Query Processing in Dynamic Environments Using Random Walk Techniques", ACM, 2004, pp. 277-286.*
Avin et al.,"The Power of Choice in Random Walks: An Emporical Study", ACM, 2006, pp. 219-228.*
Hafri et al,"High Performance Crawling System", ACM, 2004, pp. 299-306.*

(Continued)

*Primary Examiner*—Laurie Ries
*Assistant Examiner*—James J Debrow
(74) *Attorney, Agent, or Firm*—Samuel A. Kassatly; Jon A. Gibbons; Fleit, Gibbons, Gutman, Bongini & Bianco P.L.

(57) ABSTRACT

A focused random walk system produces samples of on-topic pages from a collection of hyper-linked pages such as Web pages. The focused random walk system utilizes a focused random walk to produce a focused sample, which is a random sample of Web pages focused on a topic. The focused random walk system uniformly samples pages iteratively, where each iteration follows a random link from a union of the in-links and out-links of a page. The system then classifies this randomly selected link to determine whether the page is on-topic. The random walk sampling process could comprise a hard-focus method that selects only on-topic pages at each step of the focused random walk, or a soft-focus method that allows limited divergence to off-topic pages.

19 Claims, 8 Drawing Sheets

OTHER PUBLICATIONS

McCown et al.,"Evaluation of Crawling Policies for a Web-Repository", ACM, 2006, pp. 157-167.*

Ziv Bar-Yossef et al., "Approximating Aggregate Queries about Web Pages via Random Walks," Proceedings of the 26th VLDB Conference, Cairo, Egypt, 2000, pp. 535-544.

Tapas Kanungo et al., "What Fraction of Images on the Web Contain Text?," Proceedings of the First International Workshop on Web Document Analysis (WDA2001) Seattle, Washington, USA, Sep. 8, 2001.

* cited by examiner

SYSTEM, METHOD, AND SERVICE FOR USING A FOCUSED RANDOM WALK TO PRODUCE SAMPLES ON A TOPIC FROM A COLLECTION OF HYPER-LINKED PAGES

FIELD OF THE INVENTION

The present invention generally relates to gathering statistical data of hyperlinked corpora, and in particular to a method for producing a sample of World Wide Web pages on a predetermined topic by performing a focused random walk.

BACKGROUND OF THE INVENTION

Aggregate statistical data about the World Wide Web (WWW or Web) are very useful in numerous scenarios such as, for example, market research, intelligence gathering, and social studies. In many of these applications, one is interested not in generic data about the whole Web but rather in highly focused information pertinent to a specific domain or topic. Topical Web statistics are crucial for generating opinion polls about products, market intelligence, tracking social networks, etc. Furthermore, timely acquisition of this information provides a competitive advantage such that timely reporting of such statistics is a requirement. Focused statistical data can be gathered by a brute force crawl of the whole Web, or by a "focused crawl", that collects mainly pages that are relevant to the topic of interest. Crawling, however, is an expensive enterprise requiring substantial resources.

One class of techniques for gathering topical statistical data about documents comprises focused crawling. One conventional focused crawling technique uses properties such as in-degree and anchor text keywords to guide a crawl towards relevant pages [Cho, J., et al., "Efficient Crawling Through URL Ordering", Computer Networks and ISDN Systems, 30:161-172, 1998]. Another conventional focused crawling technique uses a semi-supervised learning process to identify on-topic pages [Chakrabarti, S., et, al., "Distributed Hypertext Resource Discovery Through Examples", In Proceedings of the 25th International Conference on Very Large Databases (VLDB), pages 375-386, 1999; and Chakrabarti, S., et. al., "Focused Crawling: A New Approach to Topic-specific Web Resource Discovery", In Proceedings of the 8th International World Wide Web Conference (WWW8), pages 1623-1640, Toronto, Canada, 1999]. These conventional methods of focused crawling also introduced the notions of "hard-focus method" and "soft-focus method", referring to two possible strategies to guide the crawl to further on-topic pages.

Yet another conventional focused crawling technique uses a sophisticated focused crawling process in which the "context" of a page is used to determine whether the page is a good gateway for discovering more pages about the topic [Diligenti, M., et. al., "Focused Crawling Using Context Graphs", In Proceedings of 26th International Conference on Very Large Data Bases, Cairo, Egypt, 2000]. This context comprises the link-induced neighborhood of the page and of its content-based model. A further conventional focused crawling technique uses a reinforcement learning approach to crawling the Web [Rennie, J., et. al., "Using Reinforcement Learning to Spider the Web Efficiently", In Proceedings of International Conference on Machine Learning, 1999]. Although this technology has proven to be useful, it would be desirable to present additional improvements. These conventional focused crawling techniques are aimed at fetching as many quality pages as possible that are relevant to the focus topic. However, they are not designed to generate a random sample of on-topic pages as efficiently as possible.

Another class of techniques for gathering statistical data about documents comprises sampling web pages, possibly through random walks. One conventional sampling method uses random queries to estimate the coverage and the overlap between search engines (Bharat, K., et. al., "A Technique for Measuring the Relative Size and Overlap of Public Web Search Engines", In Proceedings of the 7th International World Wide Web Conference (WWW7), pages 379-388, April 1998).

Another conventional sampling through random walks technique uses a random walk process [Henzinger, M., et. al., "Measuring Index Quality Using Random Walks on the Web", In Proceedings of the 8th International World Wide Web Conference (WWW8), pages 213-235, May 1999], which converges to a distribution such as PageRank [Page, L., et. al., "The Pagerank Citation Ranking: Bringing Order to the Web", Technical report, Computer Science Department, Stanford University, 1998; and Brin, S., et. al., "The Anatomy of a Large-scale Hypertextual Web Search Engine", In Proceedings of the 7$^{th}$ International World Wide Web Conference (WWW1998), pages 107-117, Brisbane, Australia, 1998] over the nodes of the Web. This technique then modifies the random walk samples so as to approximate a nearly uniform distribution over the Web [Henzinger, M., et. al., "On Near-Uniform URL Sampling", In Proceedings of the 9th International World Wide Web Conference (WWW9), pages 295-308, May 2000].

Yet another conventional sampling through random walks technique uses a random walk on an undirected and regular version of the Web graph as means of generating near-uniform samples of Web pages [Bar-Yossef, Z., et. al., "Approximating Aggregate Queries About Web pages via Random Walks", In Proceedings of 26th International Conference on Very Large Data Bases, pages 535-544, Morgan Kaufmann, 2000]. A further conventional sampling and random walk technique handles both directed and undirected graphs [Rusmevichientong, P., et. al., "Methods for Sampling Pages Uniformly from the World Wide Web", In Proceedings of AAAI Fall Symposium on Using Uncertainty Within Computation, Cape Cod, Mass., 2001].

Although these sampling and random walk technologies have proven to be useful, it would be desirable to present additional improvements. These conventional sampling and random walk techniques generate an unfocused sample of pages. They cannot be used to efficiently generate a focused sample. Choosing uniformly at random a sample of Web pages about a given topic can be carried out either by a full-fledged crawl or by a focused crawl, which guides a user towards on-topic pages. However, crawling is a formidable task even when focused, requiring significant investments in infrastructure, bandwidth, and software engineering. Moreover, crawlers and focused crawlers typically prioritize fetching pages with high quality and PageRank, and thus may not be suitable for generating a uniform, unbiased sample of pages.

One conventional method uses a topical sample of Web pages to discover the fraction of images on the Web that contain textual information [Kanungo, T., et. al., "What Fraction of Images on the Web Contain Text?", In Proceedings of Web Document Analysis, 2001]. However, querying the search engine Google® generates the sample. Google® returns pages with a high PageRank; consequently, the returned pages do not have a uniform distribution. Moreover, the sample relies on the freshness of the repository maintained by Google®; this repository may not provide an updated snapshot of the Web. In general, performing a random walk that stays focused is a non-trivial task [Davison, B.

D., "Topical Locality in the Web", In Research and Development in Information Retrieval (SIGIR), pages 272-279, 2000; and Menczer, F., "Links Tell Us About Lexical and Semantic Web Content", Technical Report cs.IR/0230004, Computer Science Department, Univ. of Iowa, 2001].

A further class of techniques for gathering statistical data about documents comprises data mining of the Web. One such technique uses a process for mining implicitly defined Web communities to search for small bipartite cores as signatures for Web communities [Kumar, R., "Trawling the Web for Emerging Cyber-communities", In *Proceedings of the 8th International World Wide Web Conference* (WWW1999), pages 1481-1493, Toronto, Canada, 1999]. Another technique for data mining demonstrates that the same global structural properties of the Web graph appear also in its subgraphs; these subgraphs are specified by themes, topics, or geographical proximity [S. Dill, et. al. "Self-similarity in Web", ACM Transactions on Internet Technology, 2:205-223, 2002].

In general, conventional techniques for gathering or aggregating statistical data about the Web are focused or based on random walks, but not both focused and based on random walks. Conventional techniques require an extended period of time to crawl the Web. Further, conventional techniques require many resources in terms of computational and communication infrastructure, bandwidth, and software engineering. What is therefore needed is a system, a service, a computer program product, and an associated method for efficiently performing a focused random walk through linked documents to generate statistics or identify samples with respect to a focus topic. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for using a focused random walk to produce samples on a topic from a collection of hyper-linked pages (further referenced herein as pages or Web pages). The present system utilizes a random walk on a subgraph of a Web graph or a modified version of a Web graph to produce a sample of Web pages focused on a topic, i.e., a focused sample. This random walk on a subgraph of the Web is referenced as a focused random walk. A focused sample is a uniformly chosen sample of Web pages from a thematically unified community of pages. Themes analyzed by the present invention are typically broad themes comprising millions of pages on the Web. These themes can be diverse, ranging from domain names, through pages written in a specific language, to pages relevant to a given topic.

The present system uniformly samples Web pages on a user-supplied topic. The present system comprises a random walk sampling process that uses a classifier at each step in the random walk to determine whether or not a linked Web page is on-topic. In one embodiment, the random walk sampling process comprises a hard-focus method. The hard-focus method does not allow an off-topic page to be selected. In another embodiment, the present system comprises a neighborhood soft-focus method. The neighborhood soft-focus method allows the random walk to go to off-topic pages (within a particular distance).

For the purpose of gathering statistical data, random sampling of Web pages is a much faster, cheaper, and more reliable approach than crawling. Consequently, results provided by the present system are more current than those of a conventional crawl through the Web that takes on the order of two weeks. Further, the present system allows a user to trade off accuracy against time required to perform the focused random walk. A faster solution can be obtained that comprises some inaccuracies.

The present system provides efficient method for generating a random sample of Web pages relevant to a given user-specified topic. Conventional techniques obtain only an unfocused sample of pages from the whole Web.

As an example, consider an international company that wishes to penetrate into emerging markets in Asia. A representative sample of Web pages from the target countries can be an excellent starting point for understanding the business culture and market needs of the emerging market. Focused statistical data about domains and communities on the Web provided by the present invention can be of great importance to business development, intelligence, and social and political studies. Focused sampling can be an important addition to the toolbox of the Web data miner. Calculating degree distributions or finding the distribution of subtopics within a topic can easily be performed with a random sample, without the need to fetch millions of pages and perform calculations over massive data sets.

The present system evaluates the recall of a focused crawl by using focused sampling to estimate the fraction of the focus pages that are covered by the focused crawl. In general, a focused sample can be used to form an objective mechanism for evaluating the topic-specific coverage of general-purpose search engines, enabling a user to compare the quality of various search engines on the Web.

The present system provides an efficient method for generating a focused sample of Web pages relevant to a specified topic. In principle, an unfocused sample from the entire Web induces also a random sample of topic-relevant pages. However, such a scheme is not practical for the purpose of focused sampling. For example, obtaining n samples from a community that constitutes 0.2% of the Web requires 500n unfocused samples. This makes the sampling procedure prohibitively inefficient because the Web is extremely large, and growing larger every day. Currently, conventional search engines do not provide a service of generating a random page either from a subset of their index or their entire index.

The present system is faster and less expensive than focused crawling. The present system requires a significantly smaller number of Web pages to be fetched and can be implemented on a desktop PC. Focused sampling is reliable approach for gathering statistics because it is performed over a shorter period of time than conventional techniques for crawling the Web. This makes focused sampling less vulnerable to changes in Web pages during its execution, effectively working on a "snapshot" of the Web.

The sampling method of the present invention is based on a random walk on a graph formed by Web pages and their hyperlinks. The random walk is performed on an undirected graph, a strategy that relies on a search engine to provide in-links of a Web page. To obtain a sample of the focus data, the present system restricts the random walk to regions of the Web that contain relevant pages, thus performing a focused random walk.

In one embodiment, the present system performs the focused random walk utilizing a hard-focus method by restricting the random walk to a subgraph induced on Web pages relevant to the focus topic. In another embodiment, the present system utilizes a neighborhood soft-focus method to perform a focused random walk on a subgraph that is not well connected (i.e., has low conductance). A subgraph with low conductance occurs when the subgraph comprises of two or more subcommunities that are in small interaction with each, such as the pro-life and pro-choice groups within the abortion topic.

The neighborhood soft-focus method "extends" the subgraph on which the random walk is performed so that the subgraph also comprises some pages at the boundary of the topic. The neighborhood soft-focus method increases the connectivity of the subgraph. However, the neighborhood soft-focus method dilutes the fraction of relevant pages in the subgraph, decreasing the fraction of relevant pages traversed by the walk. To maintain sampling efficiency, the present system limits the extent to which the focused random walk may depart from the relevant Web pages during the neighborhood soft-focus method.

Using either the neighborhood soft-focus method or the hard-focus method, the present system generates an approximately uniform sample of Web pages for "well developed" topics (i.e., topics with Web pages that well-connected or exhibit high conductance). For less connected topics, the neighborhood soft-focus method generates an approximately uniform sample of Web pages.

The present system comprises the following components: a labeled example table, a hypertext classifier trainer, a focused topic classifier model, a traversal history table, a compute statistics and aggregate module, an aggregate table, and a focused random walk controller. The present system further comprises a user interface.

The labeled example table comprises on-topic examples and off-topic examples of web pages selected by the user for use by the present system in determining what the desired topic comprises. The hypertext classifier trainer develops a model and classification rules for use by the present system; this model and the classification rules are stored in the focused topic classifier model.

The focused random walk controller performs the focused random walk among pages randomly selected from, for example, the Web. The pages are classified by the focused random walk controller based on the model and classification rules generated by the hypertext classifier trainer and stored in the focused topic classifier model. The classified pages are accepted or rejected according to a predetermined method such as, for example, a hard-focus method, a no-focus method, a neighborhood soft-focus method, or a trial-and-error method.

Classified pages are stored in the traversal history table. The compute statistics and aggregate module analyzes the pages stored in the traversal history table either "on the fly" as the pages are stored in the traversal history table or at the end of the focused random walk. The analysis result generated by the compute statistics and aggregate module is stored in the aggregate table and presented to the user via the user interface.

The present invention may be embodied in a utility program such as a focused random walk utility program. The present invention also provides means for the user to select a desired topic by identifying one or more positive examples of pages that illustrate what a desired topic comprises. The present invention provides means for the user to identify one or more negative examples that illustrate what the desired topic does not comprise. The present invention further provides means for user to indicate an exit criteria for the present invention such as, for example, number of steps to be completed in the focused random walk, expiration time for the focused random walk, convergence criteria for the focused random walk, etc.

In one embodiment, the present invention provides means for a user to select a method of performing the focused random walk such as, for example, a hard-focus method, a no-focus method, a neighborhood soft-focus method, or a trial-and-error method. The present invention provides means for a user to identify parameters for the various methods of performing a focused random walk. The user then invokes the focused random walk utility program to perform a focused random walk and analyze the pages collected in the focused random walk. The set of requirements comprises positive examples of pages on topic, negative examples of pages on-topic, exit criteria for the focused random walk system, selection of a desired method of performing the focused random walk, and a plurality of parameters for the methods of performing the focused random walk.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Corpus: A possibly distributed collection of hyper-linked pages or documents of which the Web is one subset.

Internet: A collection of interconnected public and private computer networks that are linked together with routers by a set of standard protocols to form a global, distributed network.

Focused subset: a subset of a corpus that is unified by or satisfies a common property such as, for example, content, website, domain name, language, nationality, origin (i.e., a corporate website, an educational website, etc).

Focused Random Walk: a sequence of steps from one page to another in which the next page is randomly selected with a bias towards selecting pages that comprise a reference to a predetermined topic or focus.

Page: a document or other item that comprises a hyperlink linking the page to other pages.

Random Walk: a sequence of steps from one page to another in which the next page is randomly selected.

Uniform sample (unbiased selection): any document is selected with equal probability from a corpus, as for example, during a random walk or a focused random wall.

Walk: a sequence of steps from one page to another.

World Wide Web (WWW, also Web): An Internet client-server hypertext distributed information retrieval system.

Figure 1:
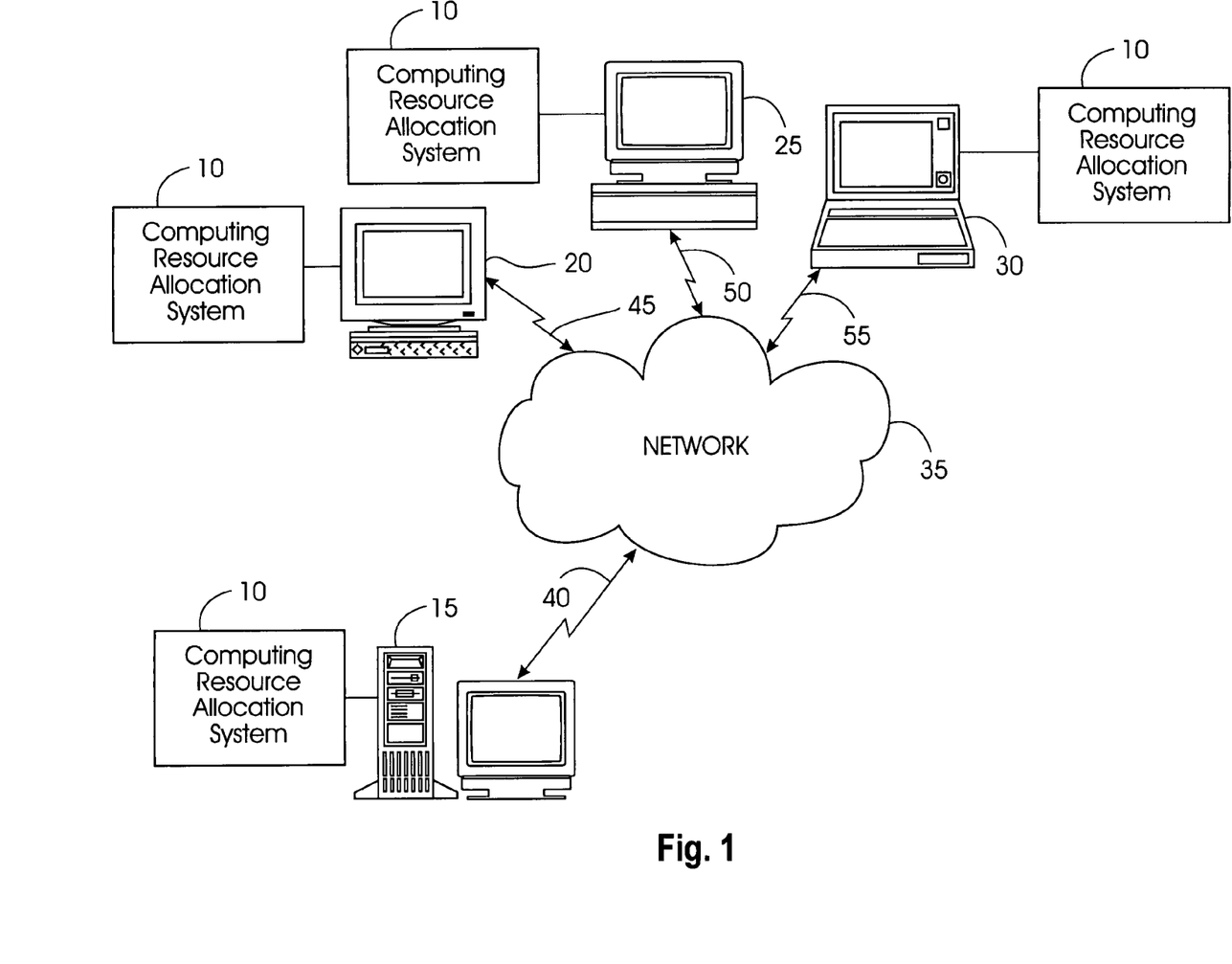
FIG. 1 is a schematic illustration of an exemplary operating environment in which a focused random walk system of the present invention can be used.

FIG. 1 portrays an exemplary overall environment in which a system, a service, a computer program product, and an associated method (the "system 10") for using a focused random walk to produce samples on a topic from a collection of hyper-linked pages according to the present invention may be used. System 10 comprises a software programming code or a computer program product that is typically embedded within, or installed on a host server 15. Alternatively, system 10 can be saved on a suitable storage medium such as a diskette, a CD, a hard drive, or like devices.

Users, such as remote Internet users, are represented by a variety of computers such as computers 20, 25, 30, and can access the host server 15 through a network 35. Computers 20, 25, 30 each comprise software that allows the user to interface securely with the host server 15. The host server 15 is connected to network 35 via a communications link 40 such as a telephone, cable, or satellite link. Computers 20, 25, 30, can be connected to network 35 via communications links 45, 50, 55, respectively. While system 10 is described in terms of network 35, computers 20, 25, 30 may also access system 10 locally rather than remotely. Computers 20, 25, 30 may access system 10 either manually, or automatically through the use of an application.

In terms of system 10, "the Web" refers to the collection of all HTML pages (also referenced herein as pages or Web pages) that can be returned as a result of a request such as, for example, a HTTP GET request from a valid server on a network such as, for example, the Internet. The returned Web pages, denoted by W, comprise both static and dynamic HTML pages. The "Web graph" is a directed graph G=(W, E) where the vertex set of G is W and the edges (E) of G correspond to the hyperlinks on pages in W. For a page w∈W, $N_{OUT}(w)$ represents the "out-neighbors" of w. The out-neighbors of w comprise Web pages that are pointed to by hyperlinks in w. Similarly, $N_{IN}(w)$ denotes the "in-neighbors" of w. The in-neighbors of w comprise Web pages that contain hyperlinks pointing to w.

Let P: W→{0, 1} be a Boolean predicate. Let S⊆W be the subset of Web pages selected by the predicate. That is, S comprises all the Web pages w, for which P(w)=1. For system 10, P is a query or a theme and S is the set of pages pertinent to this query/theme.

System 10 generates uniform (or nearly uniform) samples from the set S. Specifically, given an input parameter n, system 10 generates a uniform random sample of at least n pages from a large subset S'⊆S, with a goal of generating n uniformly and independently chosen pages from S.

System 10 assumes that W and P satisfy the following properties: given a URL of a page w∈W, system 10 can fetch the text of w; given a page w∈W, system 10 can obtain the URLs of the out-neighbors of w and the in-neighbors of w; and given a page w∈W, system 10 can determine whether P(w)=1 or P(w)=0.

System 10 performs a random walk on the Web graph to generate random samples from S. Let G be an undirected graph on N nodes. A random walk on G is a stochastic process that continuously visits the nodes of G in some random order. The random walk starts at the some node u∈G. At each step in the random walk, system 10 uniformly and randomly selects one of the neighbors of the currently visited node as the next node to visit. A probability distribution over the nodes of G is specified by a non-negative vector q of dimension N, whose entries sum to 1. A random walk on G is formally described by an N×N probability transition matrix M. M is a stochastic matrix; i.e., the rows of M are probability distribution vectors. The (u, v) entry of M contains the value 1/d(u), where d(u) is the degree of the node u, if there is a link between u and v, and zero otherwise, Given an initial probability distribution $q_0$, the random walk induces probability distributions $\{q_t\}_t$ for each step t=0, 1, 2, . . . . Consequently, $q_{t+1}$ is the product $q_t \cdot M$. The initial probability distribution $q_0$ is typically concentrated on a single node of the graph, referenced as the "starting node".

A standard fact from the theory of random walks and Markov chains is that if G is connected and non-bipartite, then the sequence $q_0, q_1, q_2, \ldots$ has a unique limit distribution $\pi$ that is independent of the initial distribution $q_0$. Moreover, the form of $\pi$ is well understood; it assigns to each node u a probability that is proportional to its degree. Specifically, $\pi(u)=d(u)/2|E|$, where |E| is the number of edges in G. In particular, when G is a regular graph (i.e., all the nodes have the same degree), the limit distribution $\pi$ is uniform over the nodes of G. Consequently, random walks provide a convenient way to generate random samples from the limit distribution using only local information about the graph.

The convergence rate to the limit distribution is termed in the Markov chain literature the "mixing time". One particularly useful characterization of the mixing time of random walks on undirected graphs is in terms of the "spectral gap" of the matrix M. The spectral gap is the difference $\sigma=|\lambda_1|-|\lambda_2|$ where $\lambda_1, \lambda_2$ are the eigenvalues of M with the largest absolute value. A classical result from the theory of Markov chains shows that the number of steps t required until $q_t$ is very close to $\pi$ is at most $$O\left(\frac{1}{\sigma} \cdot \log N\right)$$

(the hidden constant is very small). That is, the larger the spectral gap, the faster the random walk converges to its limit distribution.

Random walks on G give the following scheme for generating n random samples from the limit distribution $\pi$: run n independent random walks on G starting from arbitrary nodes (the starting nodes can be the same) for $$\tau = O\left(\frac{1}{\sigma} \cdot \log N\right)$$

steps each. System 10 takes the final nodes reached by these random walks as the sample points. Additional variations can be made in the method of the random walk such as, for example, taking a slightly longer walk and selecting the last n nodes in the walk as sample points.

System 10 performs a random walk on a connected, undirected, non-bipartite, and regular version of the Web graph. The graph is made connected by focusing on the largest strongly connected component (SCC) of the Web graph and on the part that is reachable from it (OUT). The graph is made undirected by ignoring the directions of hyperlinks, and it is made non-bipartite and regular by adding weighted self-loops to each node of the graph. That is, if D is some large number that is guaranteed to be higher than the degree of any node on the Web, then each node u ∈W is added a self-loop of weight D−d(u). As previously discussed, this random walk is guaranteed to converge to a uniform limit distribution on the nodes of SCC∪OUT.

In one embodiment, system 10 comprises hard-focused random walk sampling to generate a random sample of pages from a set S selected by the predicate P. In another embodiment, system 10 comprises a neighborhood soft-focus random walk to generate a random sample of pages from a set S selected by the predicate P.

Hard-focused sampling does not allow an off-topic page to be selected. Recall that W denotes the Web, G denotes the Web graph, P is a predicate, and $S \subseteq W$ is the set of pages selected by P. Let $G_S$ denote a subgraph of G induced on the nodes in S. The vertex set of $G_S$ is S and the edges of $G_S$ are the edges of G that connect two nodes in S. For a node u∈S, let $N_{IN}^S(u)$ and $N_{OUT}^S(u)$ denote, respectively, the sets of in-neighbors and out-neighbors of u in $G_S$, where $N_{IN}^S(u) = N_{IN}(u) \cap S$ and $N_{OUT}^S(u) = N_{OUT}(u) \cap S$. Let $d_s(u)$ denote the degree of u in Gs; that is:

$$d_s(u) = |N_{IN}^S(u)| + |N_{OUT}^S(u)|.$$

Let D be any large integer that is bigger than $d_s(u)$ for all u∈S.

The hard-focus method of system 10 runs a random walk process. The random walk starts at some node s∈S that belongs to the SCC of $G_S$. In practice, system 10 can choose some central node on the topic specified by P such as, for example, the top hit in a search engine such as Google®. When visiting a node u∈S, with probability $\alpha = 1 - d_s(u)/D$ the random walk stays in u (i.e., uses an artificial self-loop). With probability $1-\alpha$, the random walk uniformly at random chooses a page v in $N_{IN}^S(u) \cup N_{OUT}^S(u)$ and visits page v. Because the random walk "traveled" to u through an edge from some neighbor that belongs to S, $N_{IN}^S(u) \cup N_{OUT}^S(u)$ is always non-empty. The first or starting page being an exception.

If the SCC∪OUT portion of $G_S$ is large, then this hard-focus method converges to a uniform distribution over a large subset of the nodes of $G_S$. Further, the hard-focus method of system 10 generates a random sample of pages from a large fraction of the set S. Furthermore, the spectral gaps of subgraphs corresponding to well-developed topics are similar to the spectral gap of the whole Web graph, and the hard-focus method of system 10 produces near-uniform samples rather quickly on these subgraphs.

System 10 utilizes a soft-focus random walk when the graph $G_S$ does not have some properties required to guarantee quick convergence to a uniform distribution over a large subset of S when using a hard-focus method. Methods for generating samples from S comprise the following extremes. One extreme is to collect uniform samples from the whole Web W via an unfocused random walk, and then use only the samples that belong to S. Since the samples from W are uniform, also those of the samples that belong to S are uniform on S. However, system 10 may need to run the unfocused random walk for a very long time until system 10 collects a sufficient number of samples from S. In fact, system 10 expects only one in |W|/|S| of the unfocused samples to belong to S. If S is a small fraction of the Web (say, 1%) then the length of the random walk can be prohibitive.

Another extreme is the hard-focus method. Here system 10 guarantees that all the samples belong to S, but as mentioned above they may not be distributed uniformly in S or in a large subset of S.

These extremes exhibit a tradeoff between "sample precision" and "sample recall". The sample precision is the fraction of the samples generated that belong to the set S. The sample recall measures uniformity of the samples that belong to S. The hard-focus method has a good sample precision but a poor sample recall if the topic S is not "well developed" or well connected. The unfocused random walk has a high recall but a low precision.

System 10 deals with subgraphs $G_S$ that are not "well developed" by combining features of the unfocused random walk and the hard-focus method. Instead of running the random walk on the graph $G_S$ (hard focus) or on the graph G (unfocused), system 10 performs a random walk on an intermediate graph $G_T$, where $S \subseteq T \subseteq W$; this approach is referenced herein as "soft-focus sampling". T is carefully chosen to ensure both sample precision and sample recall. T is selected such that the ratio |T|/|S| is small enough to achieve a good precision and the graph $G_T$ possesses properties required for the random walk to converge quickly to a uniform distribution.

There may be many possible ways to create such an intermediate set T. In one embodiment, system 10 utilizes a "neighborhood soft-focus" method to perform the soft-focus sampling. In another embodiment, system 10 uses a "trial-and-error" method to perform the soft-focus sampling. System 10 may use any method to perform the soft-focus sampling that creates the desired intermediate set T.

Figure 2:
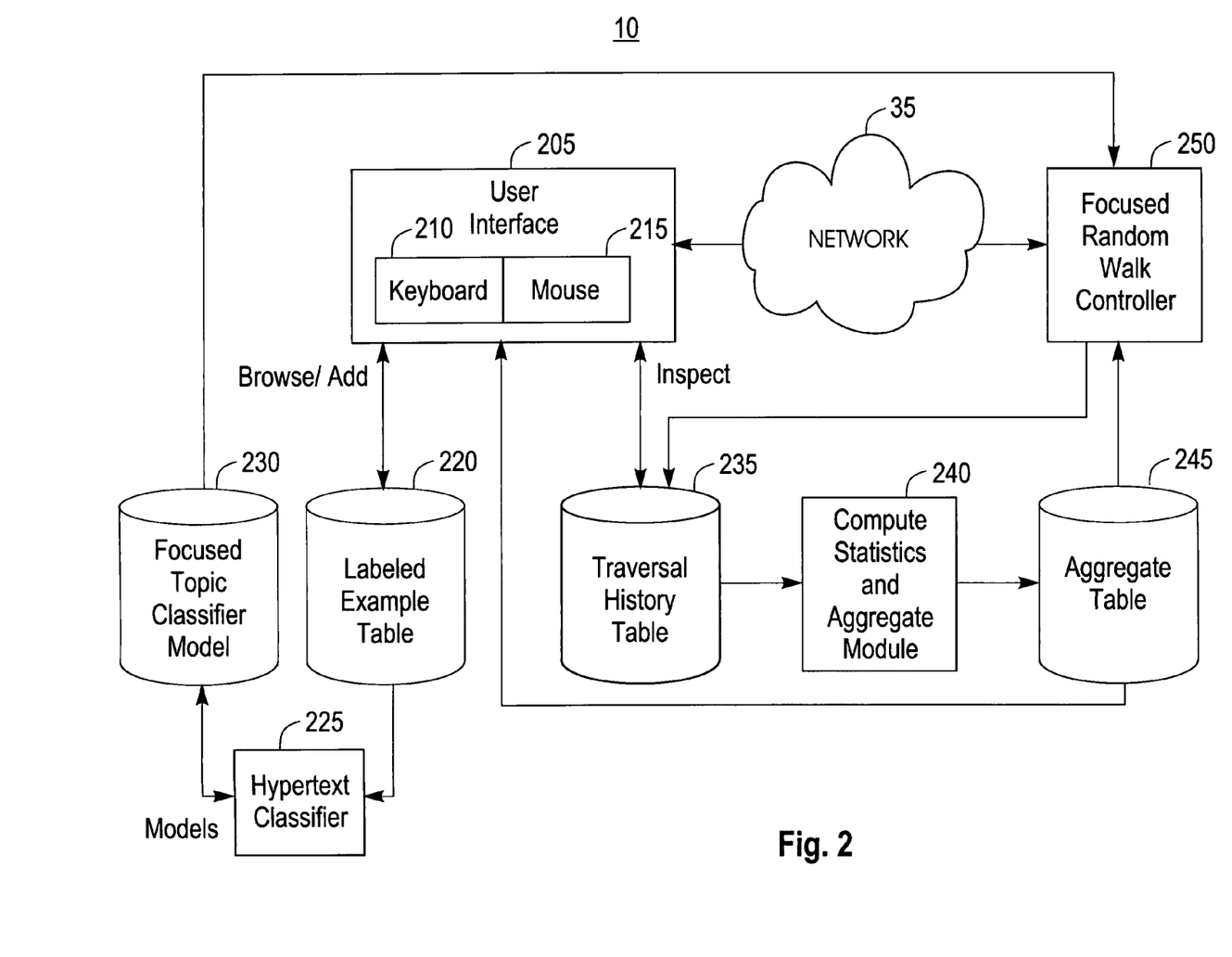
FIG. 2 is a block diagram of a high-level architecture of the focused random walk system of FIG. 1.

FIG. 2 illustrates a high-level hierarchy of system 10. System 10 comprises a user interface 205 such as, for example, a keyboard 210 and a mouse 215, a labeled example table 220, a hypertext classifier trainer 225, a focused-topic classifier model 230, a traversal history 235, a compute statistics and aggregate module 240, an aggregate table 245, or a focused random walk controller 250. System 10 is connected to the Web as illustrated by network 35.

The user interface 205 comprises an exemplary user interface to the user that comprises keyboard 210 and mouse 215. Any type of user interface may be used that allows a user to select or enter a topic for use by system 10, browse the Internet, add examples to the labeled example table 220, etc. The user browses the Web, selects examples for use by system 10 to illustrate a topic the user wishes to analyze. The user labels the examples as positive examples and negative examples, manually classifying a few Web pages. System 10 uses the positive examples to determine which Web pages are "on topic". System 10 uses the negative examples to reject Web pages that are "off topic". System 10 stores the selected and labeled Web pages in the labeled example table 220. The labeled example table 220 comprises a table or a database.

The hypertext classifier trainer 225 learns how to classify Web pages as being on-topic or off-topic by examining the positive examples and the negative examples stored in the labeled example table 220. The hypertext classifier trainer 225 generates a model from the positive examples and the negative examples. The model is stored in the focused topic classifier model 230. A user does not have to explicitly provide rules used by the hypertext classifier trainer 225 to classify Web pages. Rather, the hypertext classifier trainer 225 generates a set of rules by viewing the positive examples and the negative examples that capture the topic of interest.

For example, the user may wish to obtain a focused sampling of the topic of cycling (bicycling). The user browses the Web and identifies several Web pages on cycling that comprise the topic of interest, and several pages that do not comprise the topic of interest. The user adds the example Web pages to the labeled example table 220 and labels the example pages either positive or negative. For example, a user may be interested in the topic of cycling, but not the topic of mountain biking. Web pages comprising the topic "mountain biking" are labeled as negative examples. The hypertext classifier trainer 225 examines the positive and negative examples and reduces the positive examples and the negative examples to a set of rules and parameters in the form of a model. System 10 writes the resulting model to the focused topic classifier model 230.

The focused random walk controller 250 uses the model stored in the focused topic classifier model 230 to classify Web pages during a focused random walk performed by system 10. Any standard classifier can be used by system 10 in the focused random walk controller 250. The focused random walk controller 250 fetches a Web page via network 35 as determined by the focused random walk and determines whether the Web page is on-topic according to the model.

At the user interface 205, the user manually classifies a few Web pages for use by the hypertext classifier trainer 225. As system 10 generates the focused sample, the user may select and manually classify additional examples via the user interface 205 to modify or refine the classification process of system 10. Consequently, the model created by the hypertext classifier trainer 225 is dynamic; the model changes as the user adds positive examples or negative examples to the labeled example table 220.

The focused random walk controller 250 automatically classifies Web pages retrieved from the Web. The focused random walk learns the model created by the hypertext classifier trainer 225 and uses the model to classify new pages encountered while the focused random walk controller 250 executes the focused random walk. In general, the focused random walk controller 250 fetches a page from the Web; the fetched page becomes the current page. The focused random walk controller 250 further identifies neighboring pages of the current page from hyperlinks on the fetched Web page to other Web pages (out-links) or from other Web pages to the current Web page (in-links). In-links are identified using a standard feature provided by any of several conventional search engines. System 10 utilizes both in-links and out-links.

At each step in the focused random walk, system 10 selects one page; that selected page is designated as the current page. System 10 then randomly selects one neighboring page from a union of the in-links to the current page and the out-links from the current page. The randomly selected neighboring page becomes the current page for the next step in the random walk, if it is determined to be relevant. System 10 selects the neighboring page at random while staying focused on the topic; thus, the selected neighboring page is a random on-topic page. System 10 logs each step of the focused random walk in the traversal history table 235 and stores the Web page at each step. The focused random walk comprises a sequence of steps.

The compute statistics and aggregate module 240 examines the focused random walk comprising approximately the entire sequence of steps taken in the focused random walk, also referenced herein as a traversal. The compute statistics and aggregate module 240 computes statistics or aggregates on the collection of documents in the traversal. For example, the focused random walk is performed on a focus of "bicycling" or "cycling". The user wishes to know the sub-topics in the focus topic and the percentage of Web pages devoted to each sub-topic such as mountain biking, racing, commuting, Tour de France, etc. The compute statistics and aggregate module 240 determines those sub-topics and percentages for the user. Another example of a focused topic is "abortion" and the possible sub-topics could be "pro-life" and "pro-choice."

Yet another example of a focused topic is "book reviews" and the possible sub-topics could be various book titles.

In one embodiment, the compute statistics and aggregate module 240 removes a quantity of initial samples from the traversal such as, for example, the first thousand samples. Eliminating a quantity of initial samples from the traversal reduces bias towards the starting point of the focused random walk.

The statistics or aggregate values generated by the compute statistics and aggregate module 240 are written to the aggregate table 245. In one embodiment, the compute statistics and aggregate module 240 computes the statistics or aggregate values "on the fly" as the focused random walk proceeds, continually updating statistics or aggregates in the aggregate table 245. In another embodiment, the compute statistics and aggregate module 240 computes the statistics after the focused random walk controller 250 has completed a focused random walk of predetermined length.

The user inspects via the user interface 205 the results determined by the compute statistics and aggregate module 240 and stored in the aggregate table 245. The user can review results and calibrate or refine the execution of system 10 by, for example, adding more examples to the labeled example table 220. The user may also modify various operating parameters of system 10 such as, for example, the predetermined length of the focused random walk, the number of initial samples that is eliminated, parameters of the soft focus method, and parameters of the classification procedure.

Figure 3A:
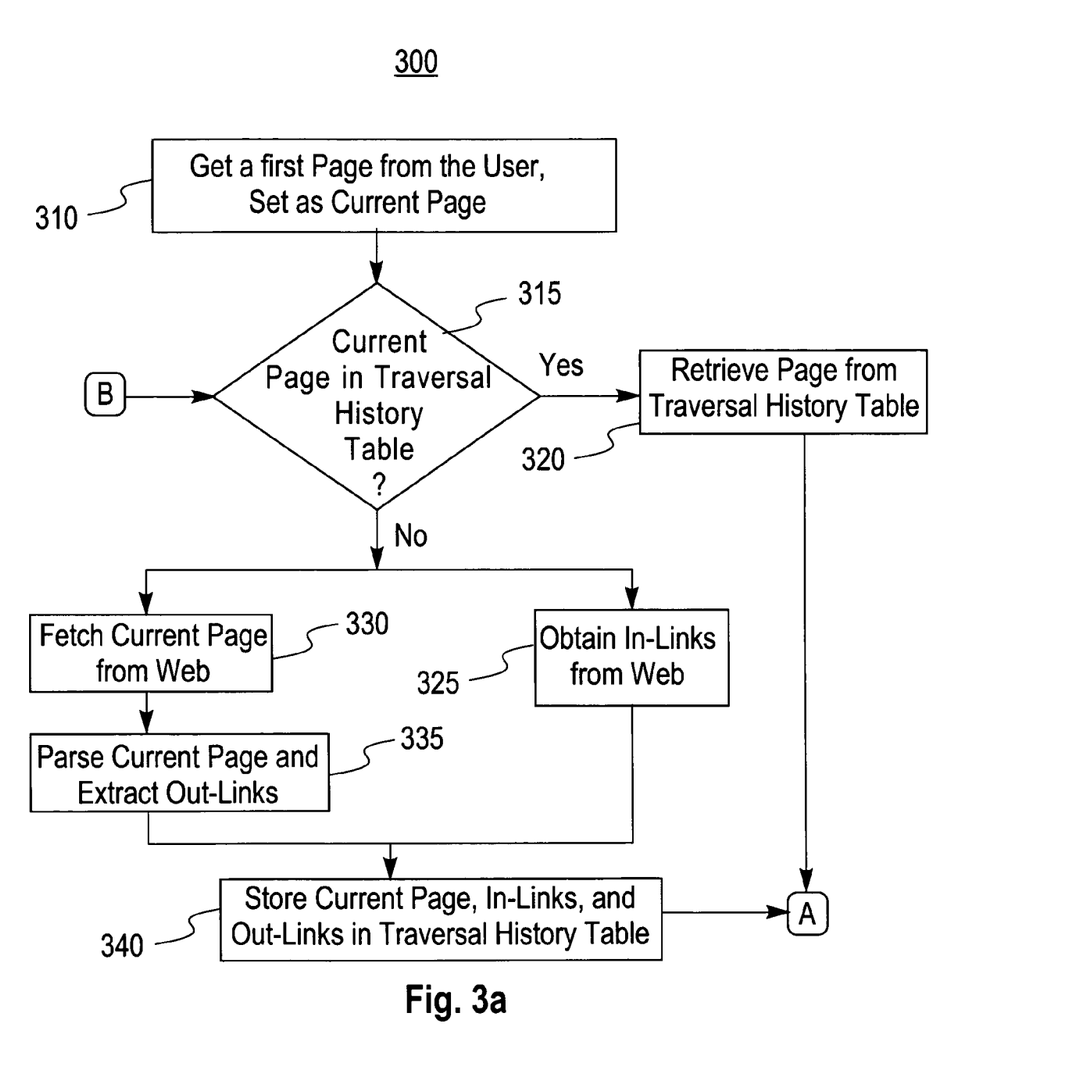
FIG. 3 is comprised of FIGS. 3A and 3B, and represents a process flow chart illustrating a method of operation of the focused random walk system of FIG. 1.
Figure 3B:
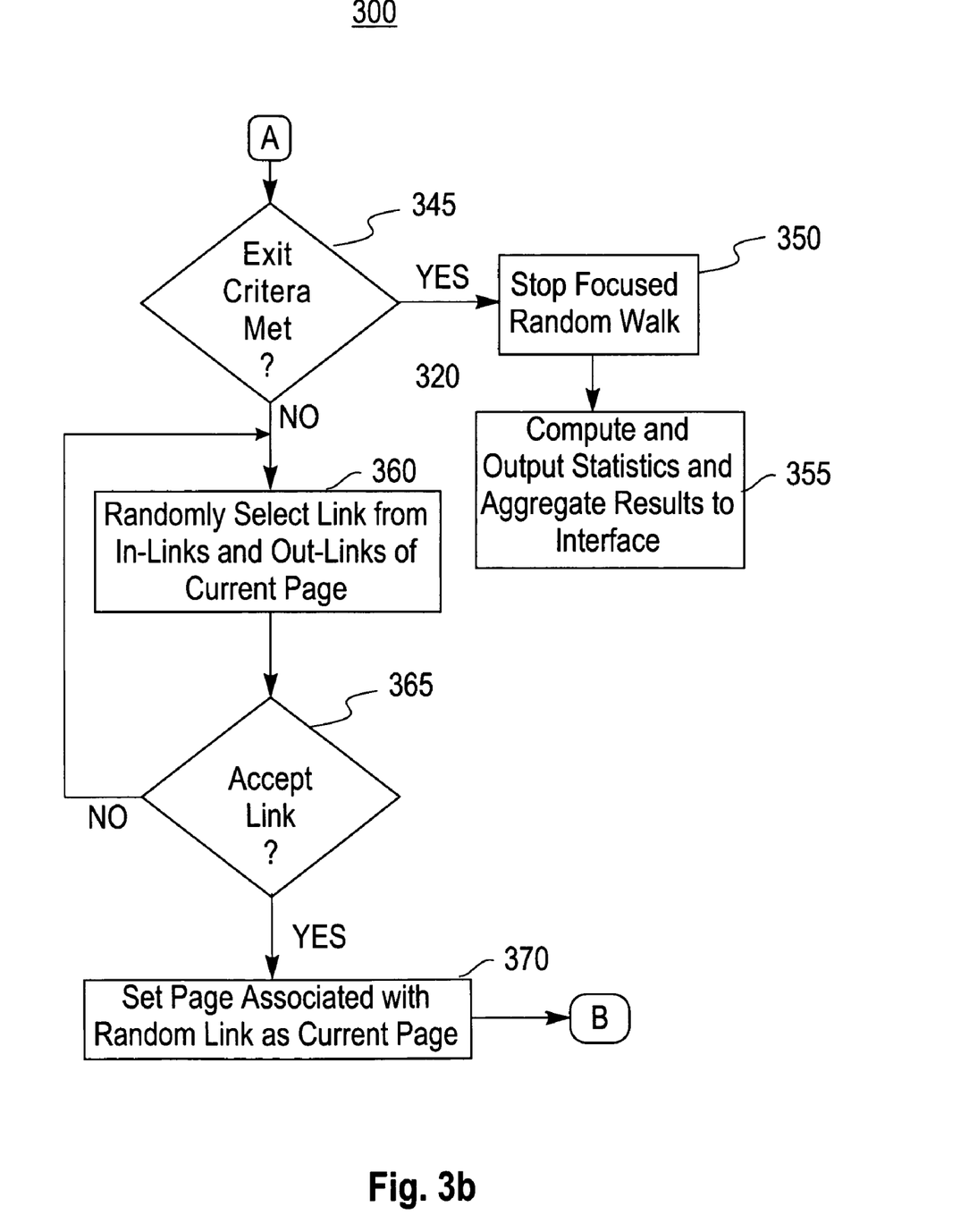

FIG. 3 (FIGS. 3A, 3B) is a process flow chart illustrating a method 300 of system 10. The focused random walk controller 250 selects a first link or page. The first page could be either a random link from the positive examples, or a specific positive example selected by the user, and would typically have at least one outlink. The focused random walk controller 250 sets the page associated with the first link as the current page (step 310). At step 315, system 10 enters a processing loop that is repeated for each step of the focused random walk.

The focused random walk controller 250 determines whether the current page has previously been traversed and this page is thus located in the traversal history table 235 (decision step 315). As the focused random walk proceeds, the focused random walk controller may select a page that has been previously visited in the current random walk. If the page has already been visited, the focused random walk controller 250 has already obtained the in-links and the out-links of the current page and stored the in-links and the out-links with the current page in the traversal history table 235. Rather than expend resources obtaining information about a previously visited page from the Web, system 10 conserves resources by utilizing the traversal history table 235. If the current page has already been traversed, the current page is stored in the traversal history table 235 and the focused random walk controller retrieves the current page, the in-links of the current page, and the out-links of the current page from the traversal history table 235 (step 320).

The focused random walk controller 250 maintains consistency by ensuring that if a node is visited several times, the list of neighbors available to the walk is the same in all the visits. That is, the first time the walk visits a node w, it stores a set of found neighbors in the traversal history table 235. The found neighbors are the out-neighbors and the in-neighbors from previously visited nodes and from the Web. If the focused random walk happens to visit w again, the focused random walk controller 250 chooses only from the list of neighbors that is stored in the traversal history table 235. It is possible that after the focused random walk visits w for the first time, the focused random walk controller 250 encounters previously unknown in-neighbors of w. The focused random walk controller 250 ignores the hyperlinks from these new in-neighbors when w is visited again.

This consistency requirement guarantees that the focused random walk is performed by the focused random walk generator 250 on a well-defined graph. This well-defined graph is a (random) subgraph of Gs (in the case of hard-focus sampling) or of $G_T$ (in the case of soft-focus sampling). The consistency requirement further reduces a natural bias the random walk has toward nodes that have high in-degree or PageRank. Such nodes are likely to be discovered early in the focused random walk, but is not revisited again more frequently than others after they have been visited once.

If the current page has not already been traversed, focused random walk controller 250 obtains the in-links of the current page from the Web (step 325) using, for example, a search engine. Concurrently to step 325, the focused random walk controller 250 fetches the current page from the Web (step 330). The focused random walk controller 250 parses the current page and extracts outlinks from the page (step 335). The focused random walk controller 250 now has in-links and out-links for the current page. The focused random walk controller adds the current page, the in-links to the current page, and the out-links from the current page to the traversal history table 235 (step 340). Each page added to the traversal history table 235 is a sample of an on-topic page, a page that matches the desired topic as determined by system 10 according to predetermined criteria.

The focused random walk determines whether predetermined exit criteria have been met (decision step 345). Predetermined exit criteria comprise, for example, a maximum number of steps in the focused random walk, an expired time for the focused random walk, a number of samples collected in the traversal history table, a stop signal provided by the user, etc. If the predetermined criteria have been met, the focused random walk controller 250 stops the focused random walk (step 350). The compute statistics and aggregate module 240 outputs statistics and aggregate results determined from the samples stored in the traversal history table 235 to the aggregate table 245 for use by the user (step 355). In one embodiment, the compute statistics and aggregate module 240 continually outputs statistics and aggregate results to the aggregate table 245 as the focused random walk is performed.

If exit criteria are not met at decision step 345, the focused random walk controller 250 randomly selects a link to follow (a random link) from among a union of the in-links of the current page and the out-links of the current page (step 360). The union of the in-links and the out-links of the current page represents all the neighbors of the current page. The search engine may return only a limited number of in-links, e.g., 200, and thus not all the in-links are represented.

The focused random walk controller 250 determines whether to accept the random link based on predetermined acceptance criteria (decision step 365). The acceptance criteria of decision step 365 are determined by the method of focused random walk followed by the focused random walk controller 250. Exemplary methods comprise a hard-focus method, a no-focus method, a neighborhood soft-focus method, or a trial-and-error method.

If the focused random walk controller 250 rejects the random link at decision step 365, the focused random walk controller 250 returns to step 360 and randomly selects another link as the random link from among the in-links and out-links of the current page. If the focused random walk controller accepts the random link at decision step 365, the focused random walk controller sets the page linked by the random link as the current page (step 370) and returns to step 315 to continue processing iteratively the focused random walk.

Figure 4:
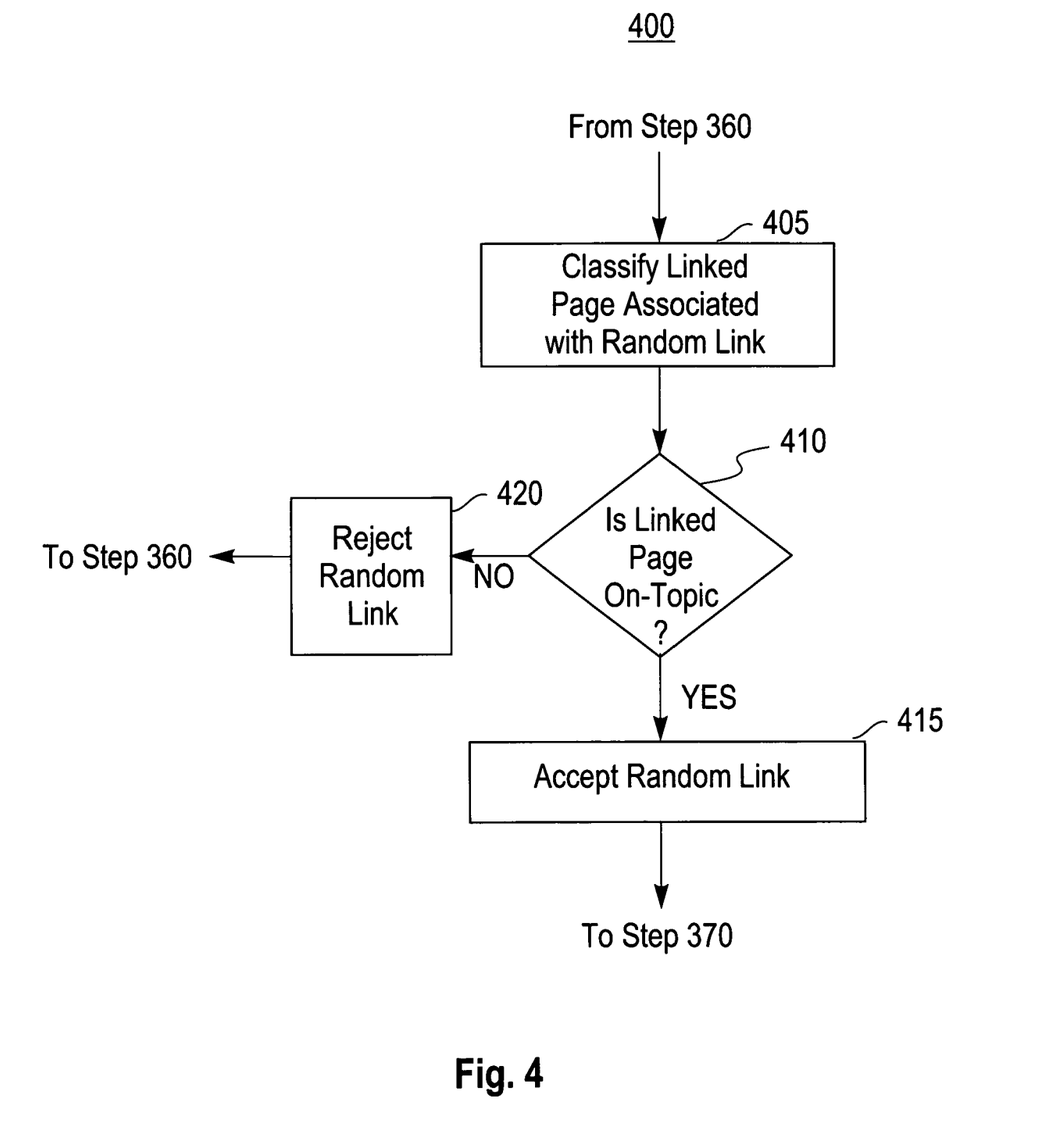
FIG. 4 is a process flow chart illustrating a hard-focus method of operation of the focused random walk system of FIGS. 2 and 3.

FIG. 4 illustrates a method 400 of decision step 365 of FIG. 3 performed by the focused random walk controller 250 using the hard-focus method to accept or reject a selected random link as being on-topic. The focused random walk controller 250 classifies a linked page associated with the random link (step 405). The focused random walk controller 250 then determines whether the linked page is on-topic (decision step 410) by examining results of the classification performed in step 405. If the linked page is on-topic, the focused random walk controller 250 accepts the random link (step 415) and proceeds to step 370 and sets the page associated with the random link as the current page. If the linked page is not on-topic, the focused random walk controller 250 rejects the random link (step 420) and returns to step 360 to randomly choose a different random link from the union of the in-links and out-links of the current page.

Figure 5:
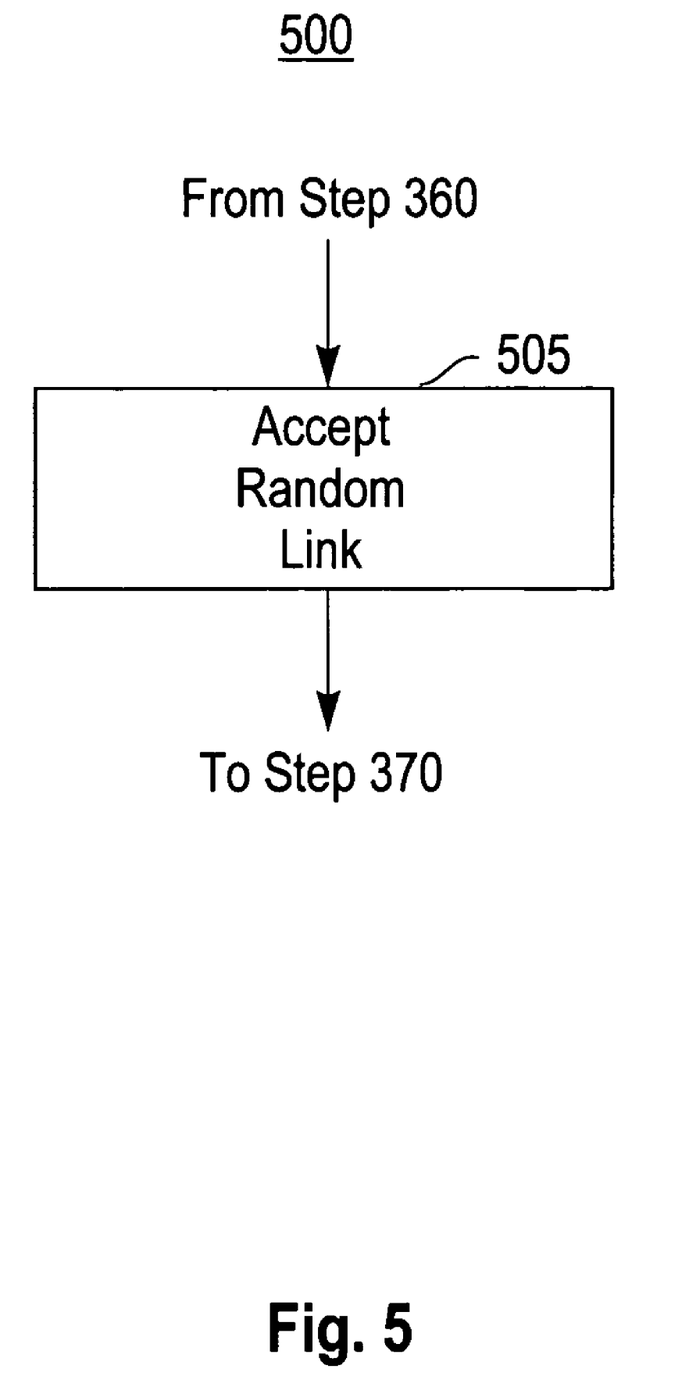
FIG. 5 is a process flow chart illustrating a no-focus method of operation of the focused random walk system of FIGS. 2 and 3.

FIG. 5 illustrates a method 500 of decision step 365 of FIG. 3 performed by the focused random walk controller 250 using the no-focus method to accept or reject a selected random link as being on-topic. With no focus provided for the focused random walk, the focused random walk controller 250 performs a random walk. Each random link is accepted regardless of the topic of the random link (step 505). The focused random walk controller 250 then proceeds to step 370, FIG. 3.

Figure 6:
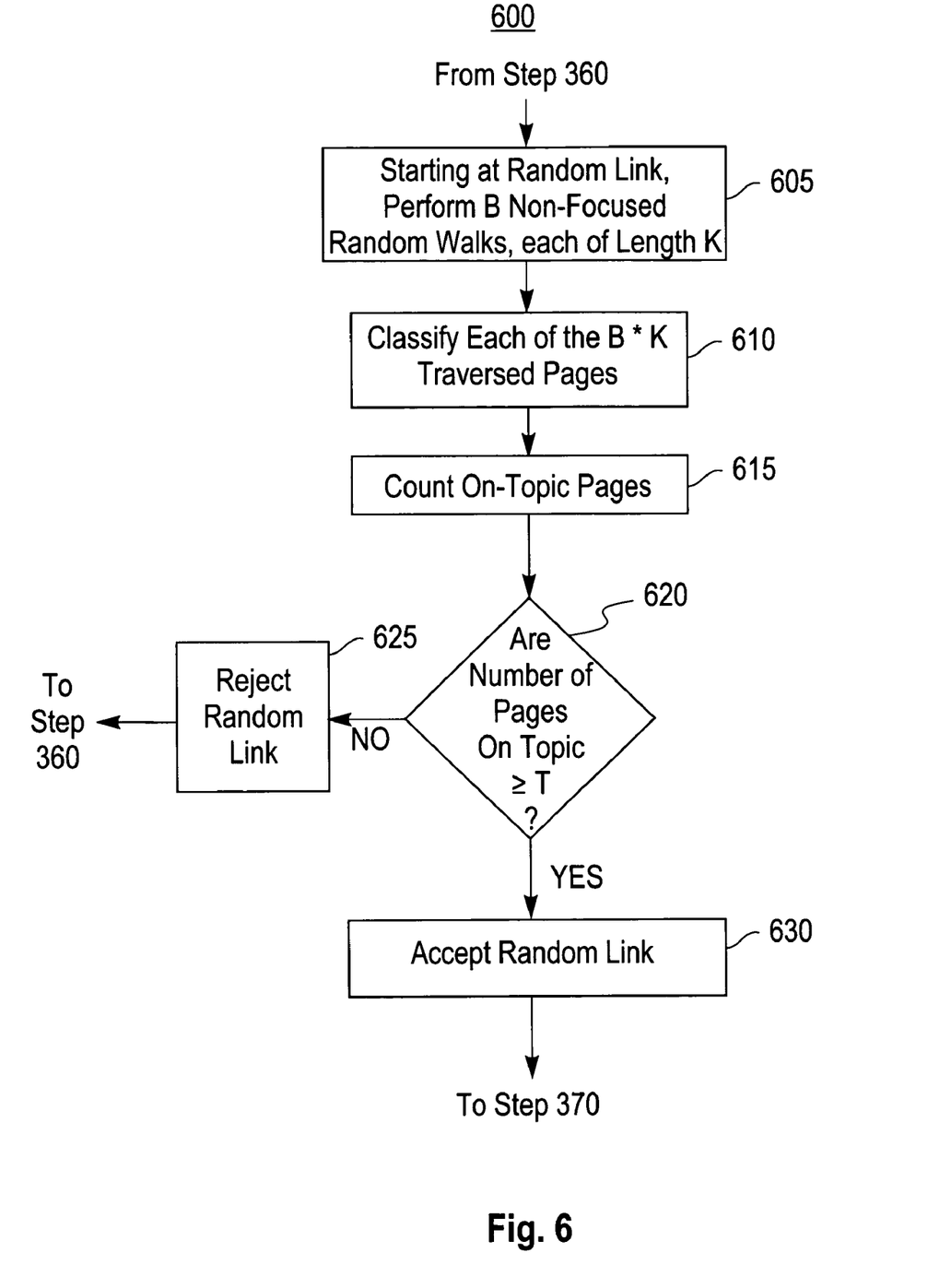
FIG. 6 is a process flow chart illustrating a neighborhood soft-focus method of operation of the focused random walk system of FIGS. 2 and 3.

FIG. 6 illustrates a method 600 of decision step 365 of FIG. 3 performed by the focused random walk controller 250 using the neighborhood soft-focus method. The focused random walk controller 250 performs "B" random walks where B is a predetermined value (step 605). Each of the B random walks starts at the random link selected at step 360, FIG. 3. Each of the B random walks comprises a length of "k" steps, where k is a predetermined value. A result of step 605 is B·k pages. The focused random walk controller 250 classifies each of the B·k pages (step 610) and counts the number of on-topic pages that the B·k pages comprise (step 615).

The focused random walk controller 250 determines whether the number of on-topic pages is greater than or equal to a predetermined threshold, T (decision step 620). If the number of on-topic pages is less than the threshold T, the focused random walk controller 250 rejects the random link (step 625). If the number of on-topic pages is greater than or equal to the threshold T, the focused random walk controller 250 accepts the random link (step 630). The focused random walk controller 250 then proceeds to step 370, FIG. 3.

Using method 600, the focused random walk controller 250 executes a few short random walks from the random link to "probe" the Web from the random link. Using the neighborhood soft-focus method, the focused random walk controller 250 is evaluating the value of the random link to the topic. An exemplary value for B is 10, for k is 5, and for T is 15.

More formally, in the neighborhood soft-focus method, the set T comprises all the pages in W that either belong to S or that are reachable from S through an undirected path of at most k links. In other words, T is the (undirected) neighborhood of S of radius k. The size of the neighborhood grows very quickly with k. Consequently, k is chosen to be very small to keep the sample precision high. In one embodiment, k=1. In this embodiment, T is simply all the nodes in S and neighbors of the nodes in S.

The neighborhood soft-focus method operates as follows. The focused random walk starts at some node s∈S. After visiting a node u∈T, with probability $\alpha=1-d_T(u)/D$, the random walk stays at u. With probability 1−α, the random walk chooses uniformly at random a neighbor v∈$N_{IN}^T$(u)∪$N_{OUT}^T$(u) and visits v.

System 10 utilizes random walks to test whether a node u belongs to T and to determine the degree $d_T$(u) of a node u∈T. System 10 performs B short random walks of length k to estimate what fraction of the pages at distance k from u belong to S. If at least one of these shorts walks lands in a page in S, then u belongs to T. The number of the walks that end at pages in S provides a crude approximation of $d_T$(u). A typical value is B=10 and k=1; consequently, system 10 fetches only 10 neighbors of u for this procedure.

If $G_T$ possesses desired properties such as, for example, bowtie and conductance properties, then the random walk on the neighborhood soft-focus T is guaranteed to converge to a uniform distribution over a large subset T'⊆T. If the intersection S∩T' constitutes a large fraction of S, then the random walk performed by system 10 has a good recall on S as well. Furthermore, if S∩T' is a large fraction of T', then the random walk has a high precision.

Figure 7:
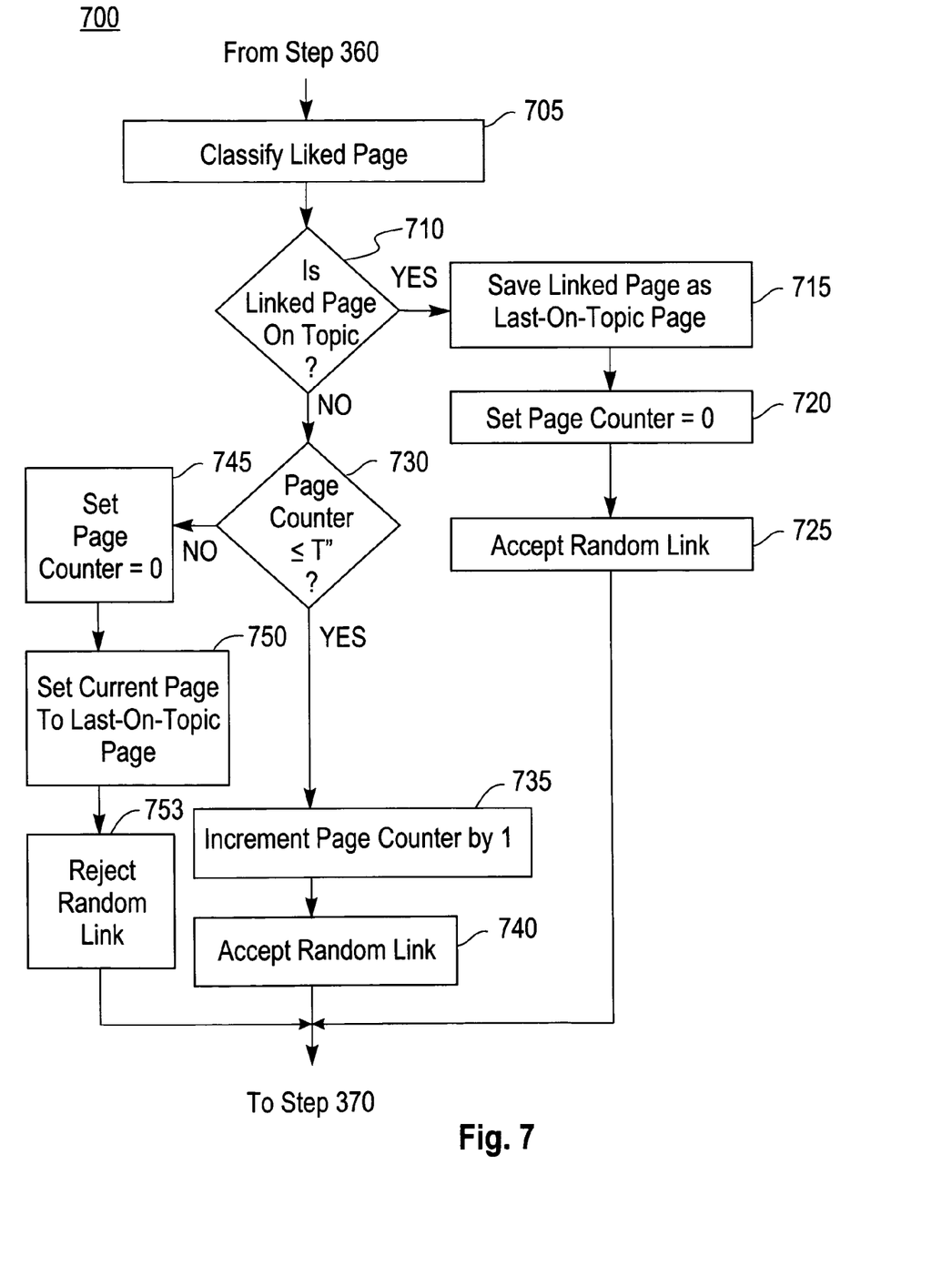
FIG. 7 is a process flow chart illustrating a trial-and-error method of operation of the focused random walk system of FIGS. 2 and 3.

FIG. 7 illustrates a method 700 of decision step 365 of FIG. 3 performed by the focused random walk controller 250 using the trial-and-error method. System 10 uses the trial-and-error method to explore the neighborhood of an on-topic page. The focused random walk controller 250 accepts an off-topic page that is linked to an on-topic page, even if the page is off topic, provided that the number of accepted off-topic pages associated with the on-topic page does not exceed a predetermined threshold, T'.

The focused random walk controller 250 classifies a linked page associated with the random link (step 705) and determines whether the linked page is an on-topic page (decision step 710). If the linked page is an on-topic page, system 10 saves the linked page in the traversal history table 235 (step 715) as the last-on-topic page; i.e., the last page found by system 10 to be on topic. System 10 resets a page counter to zero (step 720) and accepts the random link (step 725). The focused random walk controller 250 then proceeds to step 370, FIG. 3.

If the linked page is an off-topic page (decision step 710), the focused random walk controller 250 determines whether the page counter is less than or equal to a predetermined threshold, T''' (decision step 730). If yes, the predetermined threshold has not been exceeded (decision step 730). Consequently, the focused random walk controller 250 increments the page counter by 1 (step 735) and accepts the random link (step 740). The focused random walk controller 250 then proceeds to step 370, FIG. 3.

If the page counter has exceeded the predetermined threshold, T''', the focused random walk controller 250 recognizes that the neighborhood of the linked page is generally off-topic. Consequently, the focused random walk controller 250 resets the page counter to zero (step 745) and backtracks by setting the current page to the last-on-topic page (step 750) and rejects the random link (step 753). The focused random walk controller 250 then proceeds to step 370, FIG. 3.

The "trial-and-error" method is faster to perform than the neighborhood soft-focus method. However, this method lacks the theoretical guarantees of precision and recall. In this method, system 10 allows the random walk to wander away from the set S for some number of steps k. If, after k steps, system 10 has not seen a page in S, system 10 backtracks to the last page visited that belongs to S and tries again.

More formally, the random walk keeps a counter C that counts the number of steps since the last time it visited a page in S, and a pointer p to that page. The random walk starts at some page s∈S. After visiting a page u, the random walk chooses uniformly at random a neighbor v∈$N_{IN}$(u)∪$N_{OUT}$(u) where v is chosen from the full list of the neighbors in the graph G rather than just the neighbors of u in the subgraph $G_S$. If v∈S, the random walk visits v, resets the counter C to 0, and sets p=v. If v is not in S and if C<k, the random walk visits v and increments C. If C=k, the walk "backtracks" to the node pointed by p and continues as before.

For the "trial-and-error" method, system 10 cannot rigorously define the set T on which the random walk is made. The random walk of system 10 tries to approximate the behavior of a random walk on the neighborhood soft-focus while using far fewer fetches. In one embodiment, system 10 obtains an intermediate graph $G_T$ through hierarchical classification. System 10 utilizes a hierarchical taxonomy of topics such as, for example, the hierarchy represented by the Yahoo® directory. If S is the set of pages relevant to some node c in this hierarchy, system 10 can define T to be the set of pages relevant to some ancestor c' of c.

It is to be understood that the specific embodiments of the invention that have been described are merely illustrative of certain applications of the principle of the present invention. Numerous modifications may be made to a system, method, and service for described herein without departing from the spirit and scope of the present invention. Moreover, while the present invention is described for illustration purpose only in relation to the WWW, it should be clear that the invention is applicable as well to, for example, any hyper-linked corpus or set of documents.

What is claimed is:

1. A method of performing a focused random walk to produce a plurality of samples on a topic from a collection of hyper-linked pages, comprising:
  setting a current page to a user-specified page;
  repeatedly executing the following steps until an exit criteria is met:
  accepting the current page as a sample if it is classified as on topic;
  obtaining a plurality of in-links to the page;
  extracting a plurality of out-links from the page;
  selecting a random link from a union of the in-links and the out-links of the page;
  analyzing the random link according to a predetermined method;
  accepting the random link if the random link meets predetermined criteria, and setting the page linked by the random link as a current page;
  determining if the page linked by the random link which has been set to the current page has been previously visited; and
  keeping the in-links and the out-links stored in a traversal history table and associated with the current page unchanged, in response to determining that the page linked by the random walk link has been previously visited.

2. The method of claim 1, further comprising storing the current page, the in-links, and the out-links.

3. The method of claim 1, wherein the predetermined criteria are provided by a hard-focus technique that classifies the random link.

4. The method of claim 3, further comprising accepting the random link that links to a page that comprises the topic.

5. The method of claim 4, further comprising rejecting the random link that links to a page that does not comprise the topic.

6. The method of claim 1, wherein accepting the random link comprises using a neighborhood soft-focus technique.

7. The method of claim 6, wherein using the neighborhood soft-focus technique comprises performing a predetermined number, B, of random walks; wherein each of the B random walks starts at the page linked by the random link; and wherein each of the B random walks comprises a predetermined length of k steps, resulting in a total number of B·k pages.

8. The method of claim 7, further comprising classifying each of the B·k pages; and counting the number of on-topic pages included in the B·k pages.

9. The method of claim 8, further comprising determining whether the number of on-topic pages is greater than, or equal to a predetermined threshold, T.

10. The method of claim 9, wherein if the number of on-topic pages is less than the threshold T, rejecting the random link; and if the number of on-topic pages is greater than, or equal to the threshold T, accepting the random link.

11. The method of claim 1, wherein accepting the random link comprises using a trial-and-error soft focus technique to explore a neighborhood of an on-topic page.

12. The method of claim 11, further comprising classifying a linked page associated with the random link and determining whether the linked page is an on-topic page.

13. The method of claim 12, wherein if the linked page is an on-topic page, saving the linked page as a last-on-topic page.

14. The method of claim 13, further comprising resetting a page counter to zero and accepting the random link.

15. The method of claim 14, wherein if the linked page is an off-topic page determining whether the page counter is less than, or equal to a predetermined threshold, T"; if the page counter is less than, or equal to a predetermined threshold, T", considering that the predetermined threshold has not been exceeded, causing the focused random walk controller to increment the page counter, and accepting the random link.

16. The method of claim 15, if the page counter has exceeded the predetermined threshold, T", the focused random walk controller recognizing that the neighborhood of the linked page is generally off-topic, resetting the page counter to zero, and backtracking by setting the current page to the last-on-topic page.

17. The method of claim 1, wherein the exit criteria comprise any one or more of: a maximum number of steps in the focused random walk; an expired time for the focused random walk; a number of samples collected in a traversal history table; and a stop signal provided by a user.

18. The method of claim 1, wherein keeping the in-links and the out-links stored in a traversal history table and associated with the current page unchanged, in response to determining the page linked by the random walk link, which has been previously visited, includes new in-links and out-links 19. A computer program product having a plurality of executable instruction codes for performing a focused random walk to produce a plurality of samples on a topic from a collection of hyper-linked pages, comprising:

a first set of instruction codes for setting a current page to a user-specified page;

a second set of instruction codes repeatedly executing the following steps until exit criteria is met:

a third set of instruction codes for accepting the current page as a sample if it is classified as on topic;

a fourth set of instruction codes for obtaining a plurality of in-links to the page;

a fifth set of instruction codes for extracting a plurality of out-links from the page;

a sixth set of instruction codes for selecting a random link from a union of the in-links and the out-links of the page;

a seventh set of instruction codes for analyzing the random link according to a predetermined method;

an eight set of instruction codes for accepting the random link if the random link meets predetermined criteria;

a ninth set of instruction codes for determining if the paged linked by the random link which has been set to the current page has been previously visited; and a tenth set of instruction codes for keeping the in-links and the out-links stored in a traversal history table and associated with the current page unchanged, in response to determining that the page linked by the random walk link has been previously visited.

* * * * *

UNITED STATES PATENT AND TRADEMARK OFFICE
CERTIFICATE OF CORRECTION

PATENT NO. : 7,640,488 B2
APPLICATION NO. : 11/004412
DATED : December 29, 2009
INVENTOR(S) : Bar-Yossef et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1025 days.

Signed and Sealed this

Ninth Day of November, 2010

David J. Kappos
*Director of the United States Patent and Trademark Office*